(12) United States Patent
Ishibashi (10) Patent No.: US 8,266,541 B2
(45) Date of Patent: Sep. 11, 2012

(54) MESSAGE WINDOW DISPLAY CONTROL APPARATUS, METHOD, AND PROGRAM PRODUCT

(75) Inventor: Yuki Ishibashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 11/684,728

(22) Filed: Mar. 12, 2007

(65) Prior Publication Data

US 2007/0234221 A1    Oct. 4, 2007

(30) Foreign Application Priority Data

Mar. 15, 2006 (JP) ................................ 2006-071725
Dec. 28, 2006 (JP) ................................ 2006-356386

(51) Int. Cl.
*G06F 3/048* (2006.01)

(52) U.S. Cl. ........................ 715/781; 715/759

(58) Field of Classification Search ............ 715/781, 715/759
See application file for complete search history.

(56) References Cited

U.S. PATENT DOCUMENTS

| | | | | |
|---|---|---|---|---|
| 4,954,818 A * | 9/1990 | Nakane et al. | ................. | 715/790 |
| 5,455,903 A * | 10/1995 | Jolissaint et al. | ............ | 715/835 |
| 5,881,481 A * | 3/1999 | Bashaw et al. | ................. | 40/593 |
| 6,128,017 A * | 10/2000 | Alimpich et al. | ............ | 715/808 |
| 6,518,983 B1 * | 2/2003 | Grohmann et al. | ........... | 715/781 |
| 6,583,795 B1 * | 6/2003 | Ohyama | ....................... | 715/785 |
| 6,772,219 B1 * | 8/2004 | Shobatake | ................... | 709/238 |
| 6,957,395 B1 * | 10/2005 | Jobs et al. | ..................... | 715/765 |
| 7,260,605 B1 * | 8/2007 | Okada et al. | ................. | 709/206 |
| 7,343,566 B1 * | 3/2008 | Chaudhri et al. | ............. | 715/781 |
| 7,552,397 B2 * | 6/2009 | Holecek et al. | ............... | 715/788 |
| 7,853,891 B2 * | 12/2010 | Chaudhri et al. | ............. | 715/781 |
| 2003/0071851 A1 * | 4/2003 | Unger et al. | ................. | 345/781 |
| 2003/0098882 A1 * | 5/2003 | Cowden et al. | .............. | 345/781 |
| 2003/0163490 A1 | 8/2003 | Kitamura | | |
| 2004/0081079 A1 * | 4/2004 | Forest et al. | ................. | 370/216 |
| 2005/0198494 A1 * | 9/2005 | Ishibashi | ....................... | 713/155 |
| 2005/0278643 A1 * | 12/2005 | Ukai et al. | ..................... | 715/751 |
| 2006/0059238 A1 * | 3/2006 | Slater et al. | ................... | 709/206 |
| 2008/0059591 A1 * | 3/2008 | Denis | ............................ | 709/206 |
| 2008/0281933 A1 * | 11/2008 | Boss et al. | .................... | 709/206 |

FOREIGN PATENT DOCUMENTS

| | | |
|---|---|---|
| JP | 1-121894 | 5/1989 |
| JP | 2002-278802 | 9/2002 |
| JP | 2003-330576 | 11/2003 |
| JP | 2004-515000 | 5/2004 |

OTHER PUBLICATIONS

Publication No. 2002-278802, Inventor Nishimaki Akiyoshi, English machine translation, Title, Device and System for Controlling Window, Control Method for Window Controller, and Medium for Providing Control Program, Date of publication of application : Sep. 27, 2002.*

Office Action issued Feb. 7, 2012 in Japan Application No. 2006-356386.

* cited by examiner

*Primary Examiner* — Mark Rinehart
*Assistant Examiner* — Meseker Takele
(74) *Attorney, Agent, or Firm* — Oblon, Spivak, McClelland, Maier & Neustadt, L.L.P.

(57) ABSTRACT

A disclosed technology is for controlling the operation of displaying message windows. Plural message windows are not displayed at the same time in response to plural requests being made to start displaying the same message window.

8 Claims, 10 Drawing Sheets

| Operation | Displayed UI |
|---|---|
| Select Menu from frame application (Plumeria)— [File]–[register]– [load file] | (UI screenshot showing Personal document tree with menus: File(F) Edit(E) Display(V) Document(D) Section(S) Tool(U) Help(H); tree items include Personal document, Personal cabinet, For shared access function, remcab, trash box, disaster, job Binder (RPCS printer), Window document, bigmoon [RS-G1 Mark2], acom [OAK], punisher, SITAR, distribution server (acom), imagio NeoC385 (RNP8B22AB), distribution server (SMALLMOON), job Binder (RPDL printer), celle, distribution server (kylie), ashley [D1], mary [D1S], Delivery server (punisher); right panel: Personal document, remcab, new MicrosoftExc... 2, new MicrosoftExc... 1; menu: Register document (I), Create new folder (N), Search (D) free search scan (F), Print list of documents (L), Display (V) align (L), Renew to latest information (R); submenu: Create new document from application (A), Load file (F), Scan (S)) |

FIG.5B

| Operation | Select file to load | Displayed UI |
|---|---|---|
| | 2 | Open file — location of file: Sample data<br>Sample folder, Docuworks, 001.tif, 001.tif, 002.tif, 003.tif<br>Plu backup data.exe, document-1.tif, document-2.tif, document-3.jpg<br>File name (N): 001.tif<br>File type (T): All files<br>☐ Merge plural files into single document (V)<br>☐ Convert data and load (C)<br>⊙ convert into image (M)  ○ turn into PDF (P)<br>☐ Delete original file (F)<br>open (O) / cancel / Help (H) |
| Message displayed while loading file | 3 | Ridoc Desk Navigator<br>⚠ Do not eject medium. Data may be destroyed. |

| Requested drive ID | Type of requested drive | Requirement |
|---|---|---|
| A | FDD | required |
| C | HDD | not required |
| D | HDD | not required |
| H | USB memory | required |
| L | DVD drive | required |
| . | . | . |

FIG.9

MESSAGE WINDOW DISPLAY CONTROL APPARATUS, METHOD, AND PROGRAM PRODUCT

BACKGROUND OF THE INVENTION

1. Field of the Invention

The present invention relates to a message window display control apparatus and method, and a program product used in this apparatus and method.

2. Description of the Related Art

In conventional message window display methods executed in computers, a message window is displayed for each process. Patent Document 1 discloses an example of a conventional window controller.

Patent Document 1: Japanese Laid-Open Patent Application No. 2002-278802

As described above, in conventional message window display methods, a message window is displayed for each process. Accordingly, there are cases where similar message windows are displayed at the same time, which makes it unclear to the operator which operation is being processed.

SUMMARY OF THE INVENTION

The present invention provides a message window display control apparatus, method, and program product in which one or more of the above-described disadvantages are eliminated.

A preferred embodiment of the present invention provides a message window display control apparatus, method, and program product in which only one message window indicating a process is displayed at a time.

An embodiment of the present invention provides a message window display control apparatus including a display unit configured to display a message window; a request unit configured to make a request to start or end displaying a message window; and a display control unit configured to control the display unit not to display plural message windows at the same time in response to the request unit making plural requests to start displaying the same message window.

An embodiment of the present invention provides a message window display control method including the step of refraining from displaying plural message windows at the same time in response to plural requests being made to start displaying the same message window.

An embodiment of the present invention provides a program product that causes a computer to execute a procedure including the steps of displaying a message window; making a request to start or end displaying the message window; and refraining from displaying plural message windows at the same time in response to plural requests being made to start displaying the same message window.

According to one embodiment of the present invention, only a single window is displayed at once, thus improving operability for the operator.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
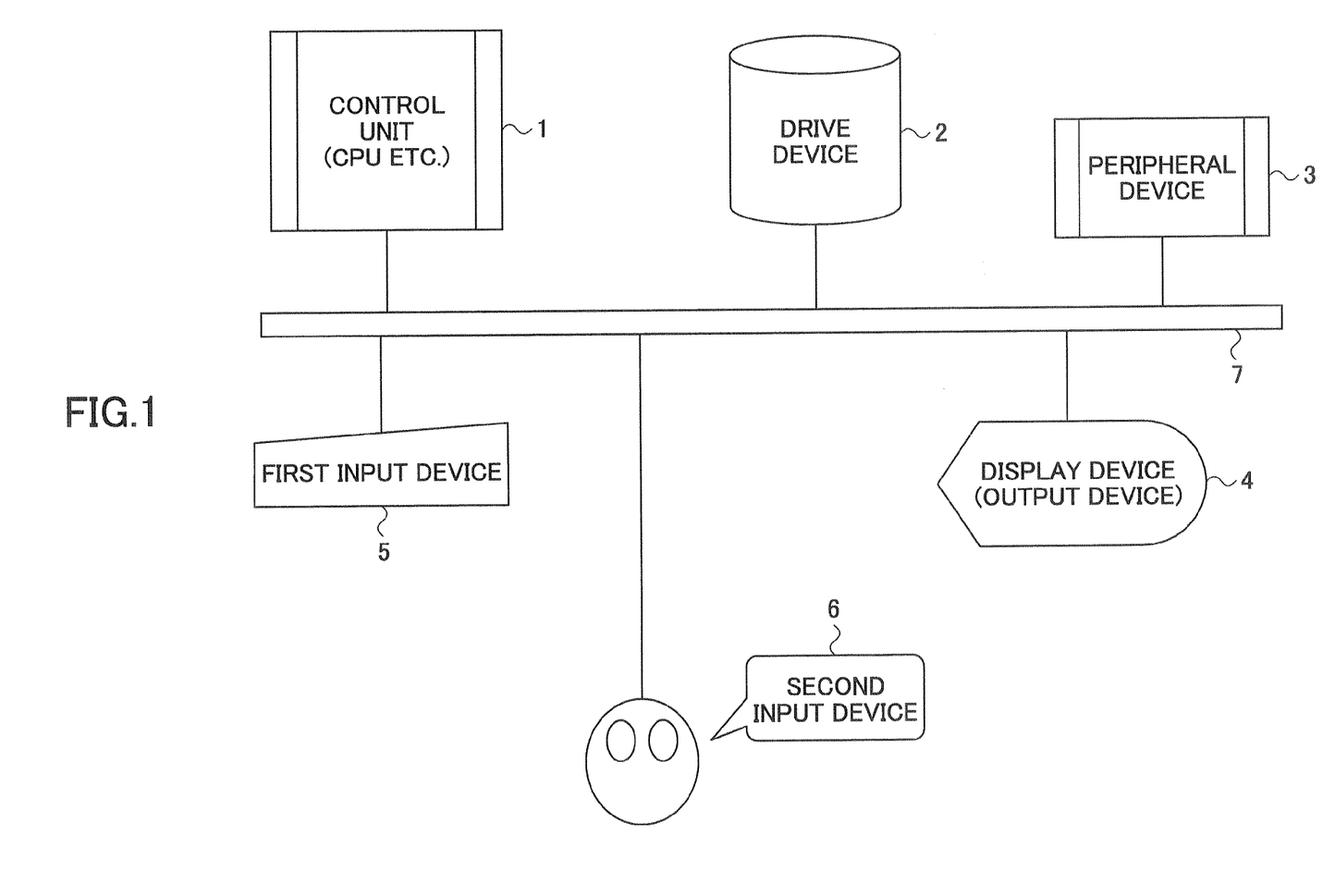
FIG. 1 is a block diagram of a computer provided with a message window display control apparatus according to an embodiment of the present invention.

FIG. 1 is a block diagram of a computer provided with a message window display control apparatus according to an embodiment of the present invention. A control unit 1 including a CPU and a storage device, a drive device 2 including an HDD, a peripheral device 3 such as a printer, a display device (output device) 4 such as a liquid crystal panel, a first input device 5 such as a keyboard, and a second input device 6 such as a mouse are interconnected via a bus line 7.

Figure 2:
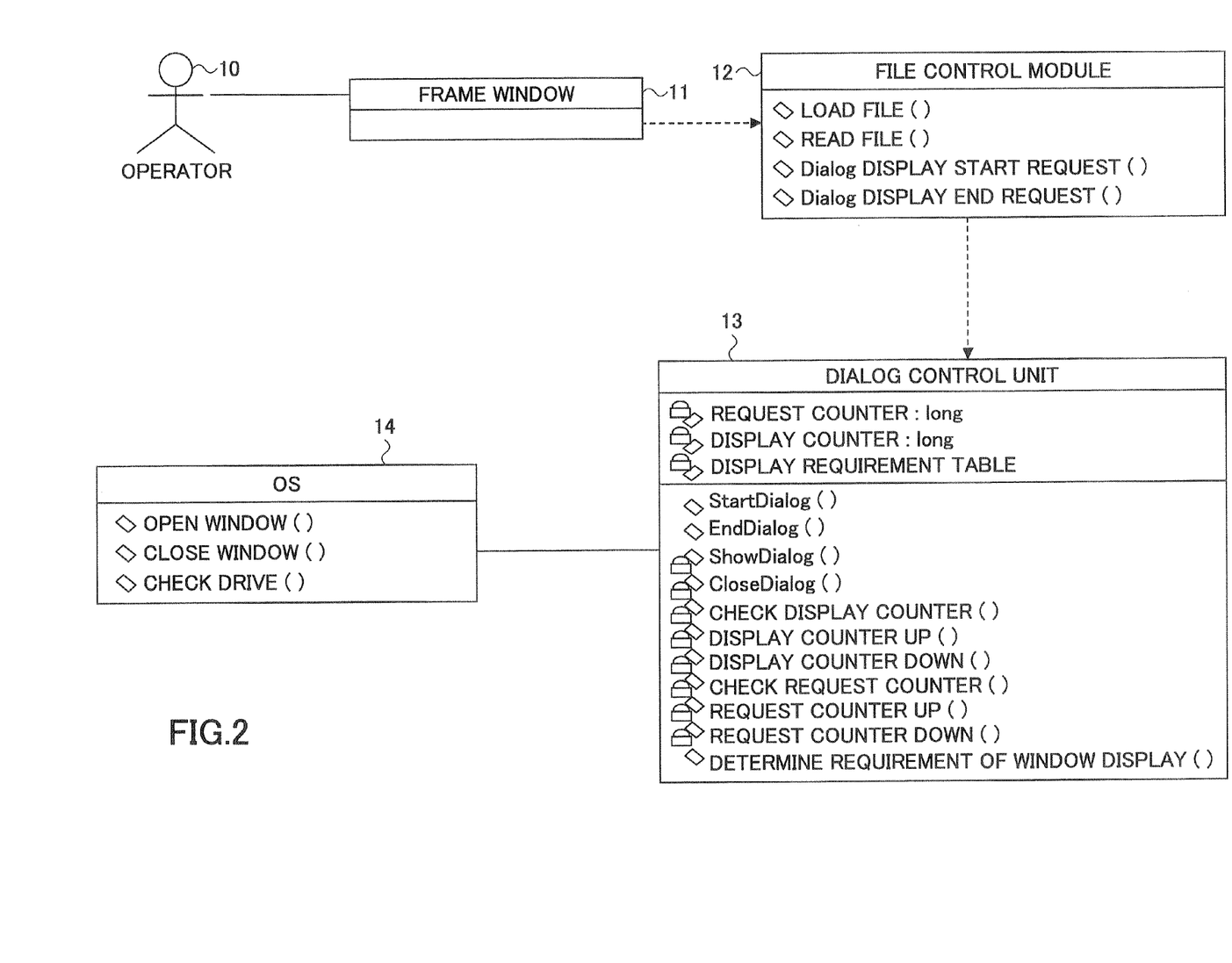
FIG. 2 is a block diagram of a program module structure according to an embodiment of the present invention.

FIG. 2 is a block diagram (class diagram) of a program module structure of the CPU in the control unit 1. An operator 10 sends a request via a frame window 11 to a file control module 12 that controls a UI (User Interface). In response to the request, the file control module 12 controls a dialog control unit 13. An OS (operating system) 14 opens/closes a window or checks a drive in response to a request from the dialog control unit 13.

As shown in FIG. 2, the file control module 12 loads a file, reads a file, makes a request to start displaying a Dialog (display start request), and makes a request to end displaying the Dialog (display end request). The dialog control unit 13 is provided with a request counter for counting the number of display start requests, a display counter for counting the number of message windows being displayed, a display requirement table, and includes various functions as shown in FIG. 2.

Figure 3:
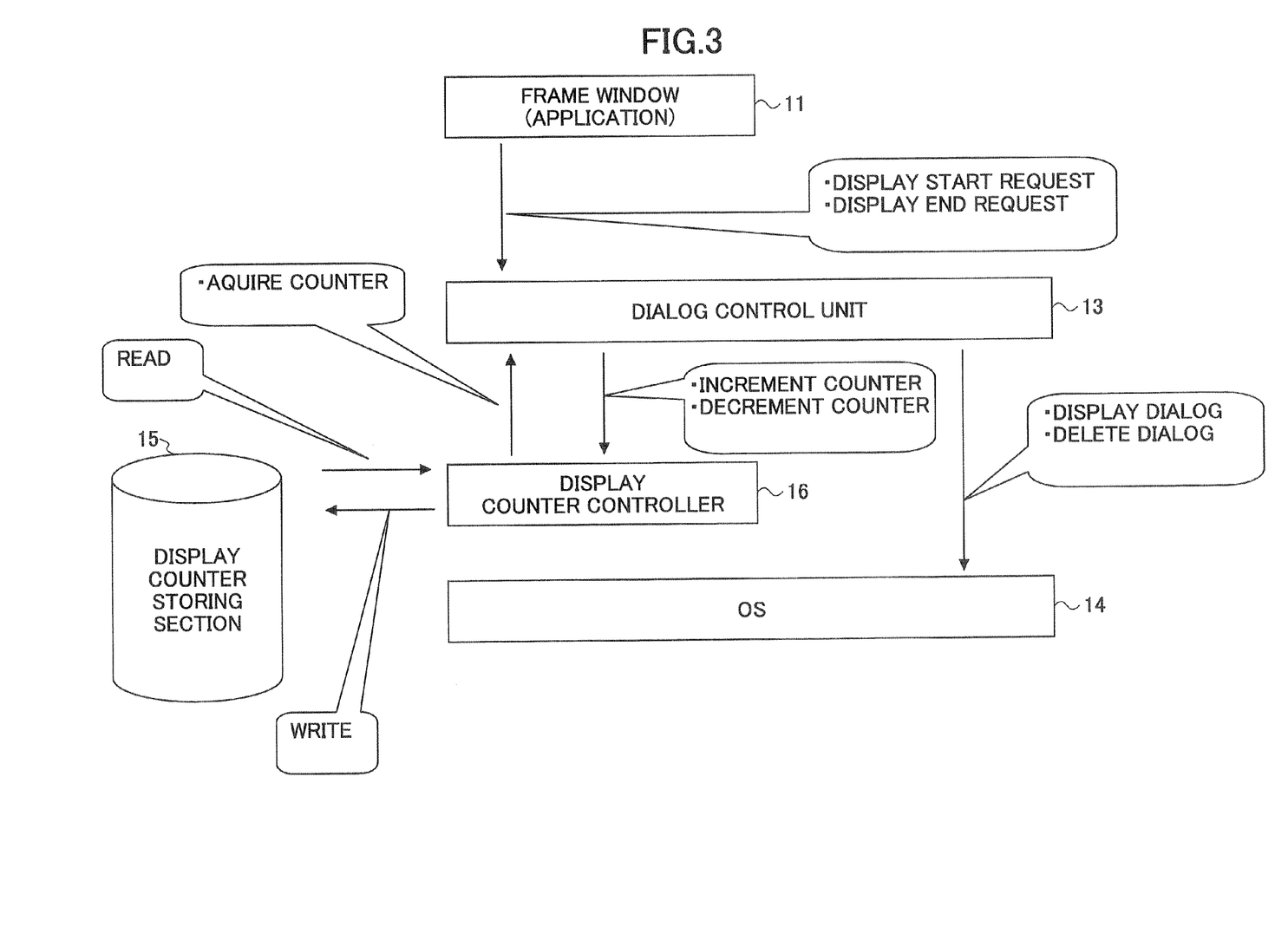
FIG. 3 is a module block diagram according to an embodiment of the present invention.

FIG. 3 is a module block diagram according to an embodiment of the present invention. The frame window 11 sends a Dialog display start request to the dialog control unit 13. In response to the request, the dialog control unit 13 reads (READ) the display counter from a display counter storing section 15 via a display counter controller 16, and acquires the counter value. After checking the display counter, the dialog control unit 13 sends a request to the OS 14 to display/delete a Dialog according to the counter value. Furthermore, the dialog control unit 13 performs addition/subtraction on the display counter and writes (WRITE) the display counter value in the display counter storing section 15 via the display counter controller 16. The OS 14 displays/deletes the Dialog in response to the request from the dialog control unit 13.

First-fourth embodiments of the present invention are described below. In these embodiments, a "message window" refers to a window within a UI, such as a dialog window and an in progress window (i.e., indicating that a process is being performed). The first-third embodiments describe operations for controlling whether to display an in progress dialog window and the fourth embodiment describes operations for controlling whether to display an error message window.

Figure 4:
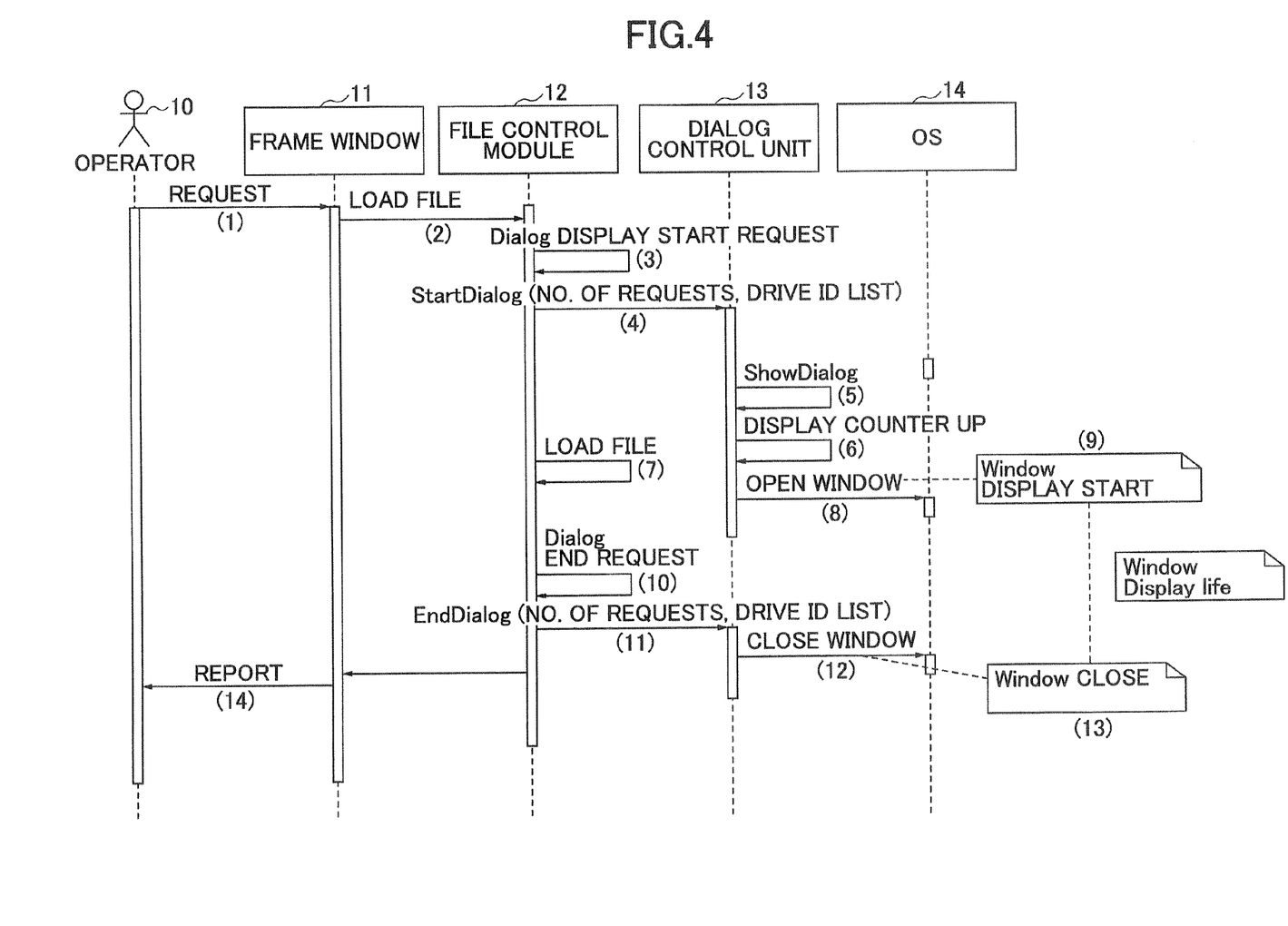
FIG. 4 is a sequence chart of a process according to a first embodiment of the present invention.

FIG. 4 is a sequence chart according to the first embodiment. The first embodiment describes a window display control operation when a single request is made. This example is for controlling a message indicating that a process is in progress when the operator 10 makes an instruction to load a file.

The following sequence is described with reference to FIG. 4.

Figure 5A:
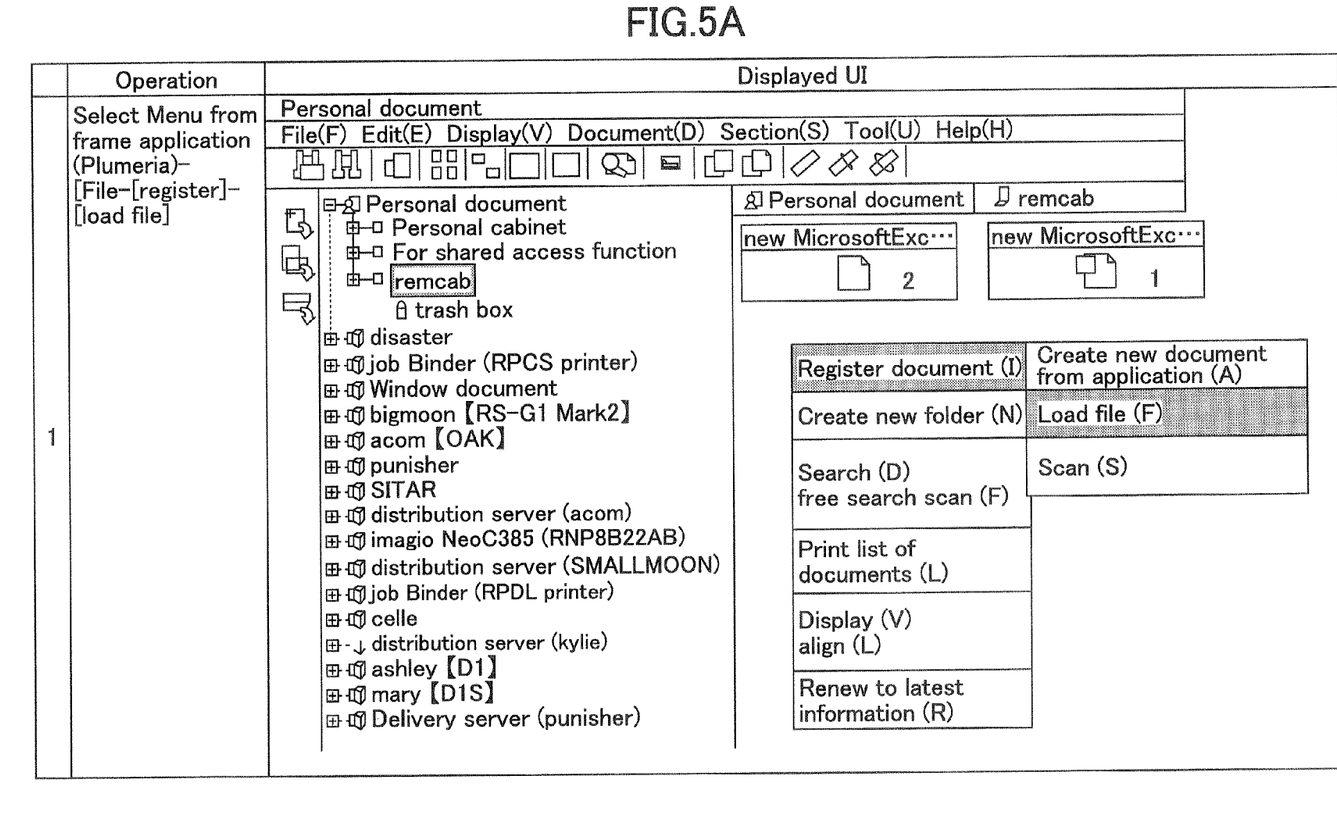
FIGS. 5A, 5B illustrate examples of UIs according to an embodiment of the present invention.
Figure 5B:
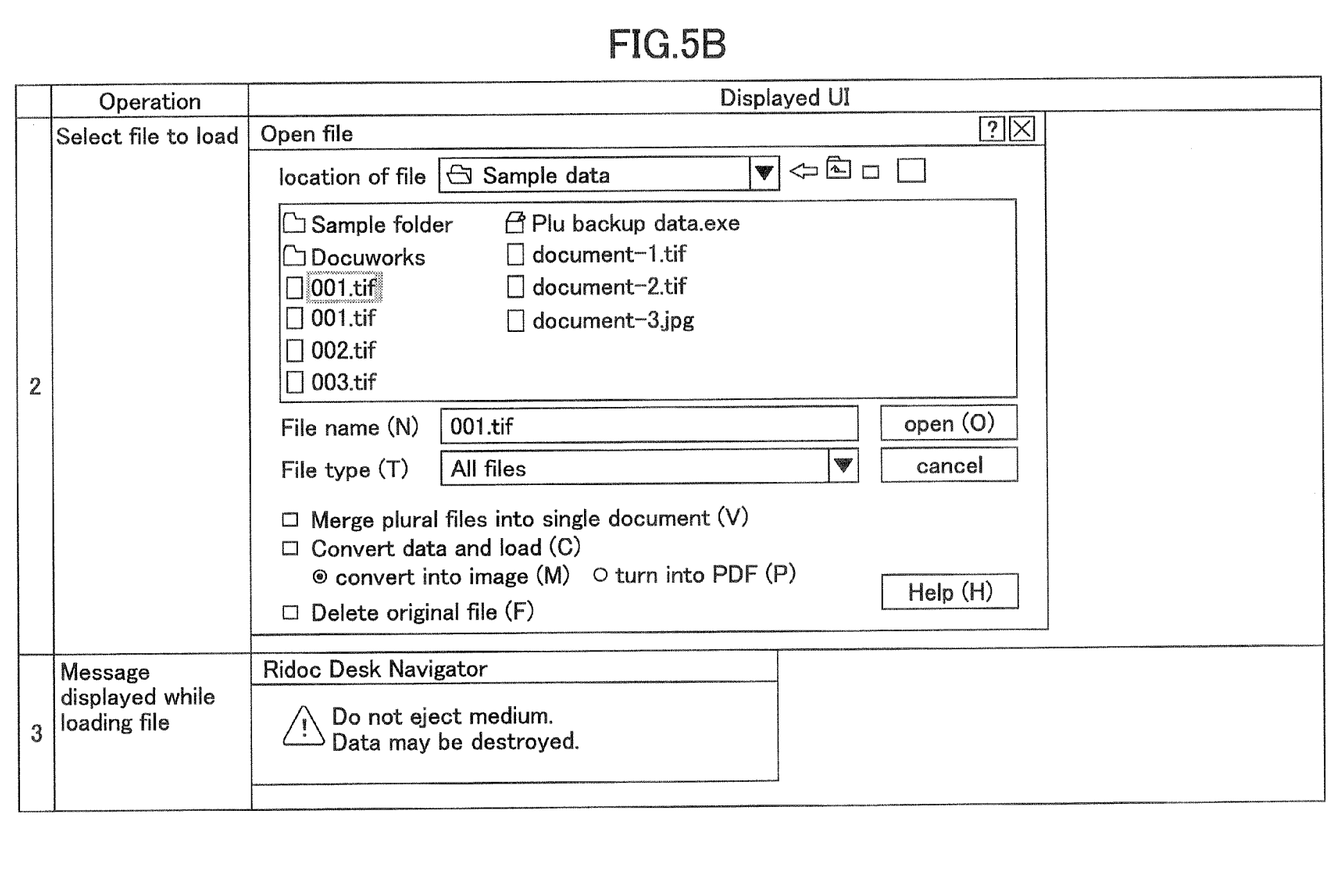

(1) The operator 10 makes a request to, for example, load a file via a UI as shown in 1 and 2 of FIGS. 5A, 5B.

(2) The frame window 11 that controls the UI instructs the file control module 12 to load the file.

(3) The file control module 12 sends a request to the dialog control unit 13 to start displaying a Dialog window.

(4) The request is made (call StartDialog).

(5) The dialog control unit 13 reads (READ) the display counter from the display counter storing section 15 via the display counter controller 16, and acquires the counter value. The dialog control unit 13 checks the display counter, and when the counter is indicating "0" (no windows displayed), the dialog control unit 13 calls a display function ShowDialog, which is an internal method.

(6) When the counter is indicating "0" (no windows displayed), the dialog control unit 13 increments the value of the display counter by one (display counter UP), and writes the display counter value in the display counter storing section 15 via the display counter controller 16. When the counter is indicating "1 or more", the dialog control unit 13 only increments the value of the display counter by one (display counter UP), without calling the display function ShowDialog described in (5), which is the internal method, and writes the display counter value in the display counter storing section 15 via the display counter controller 16.

(7) Meanwhile, the file control module 12 loads the file.

(8) The dialog control unit 13 sends a window display request to the OS 14.

(9) The OS 14 opens a window, and starts displaying a message. For example, a message shown in "3" of FIG. 5B is displayed.

(10) The file control module 12 sends a Dialog end request to the dialog control unit 13.

(11) The request is made (call EndDialog).

(12) The dialog control unit 13 reads (READ) the display counter from the display counter storing section 15 via the display counter controller 16, and acquires the counter value. The dialog control unit 13 checks the display counter, and when the counter is indicating "1", the dialog control unit 13 sends a request to the OS 14 to close the window in response to the display end request, decrements the value of the display counter by one (display counter DOWN), and writes the display counter value in the display counter storing section 15 via the display counter controller 16. When the counter is indicating "2 or more", the dialog control unit 13 only decrements the value of the display counter by one (display counter DOWN), without sending a request to the OS 14 to close the window in response to the display end request, and writes the display counter value in the display counter storing section 15 via the display counter controller 16.

(13) The OS 14 closes the window. The display life of the window starts when the OS 14 starts displaying the window and ends when the OS 14 closes the window.

(14) The file control module 12 reports the end of the sequence to the operator 10 via the frame window 11.

As described above, in the conventional technology, there are cases where similar message windows are displayed for plural processes at the same time, which makes it unclear to the operator which operation is being processed. However, according to the present embodiment, only a single window indicating that a process is in progress is displayed at once, which makes it clear to operator which operation is being processed, thus improving operability.

For example, when downloading a file from a removable medium or when loading a file into a removable medium, a message can be displayed saying "Do not eject medium. The data may be destroyed".

Figure 6:
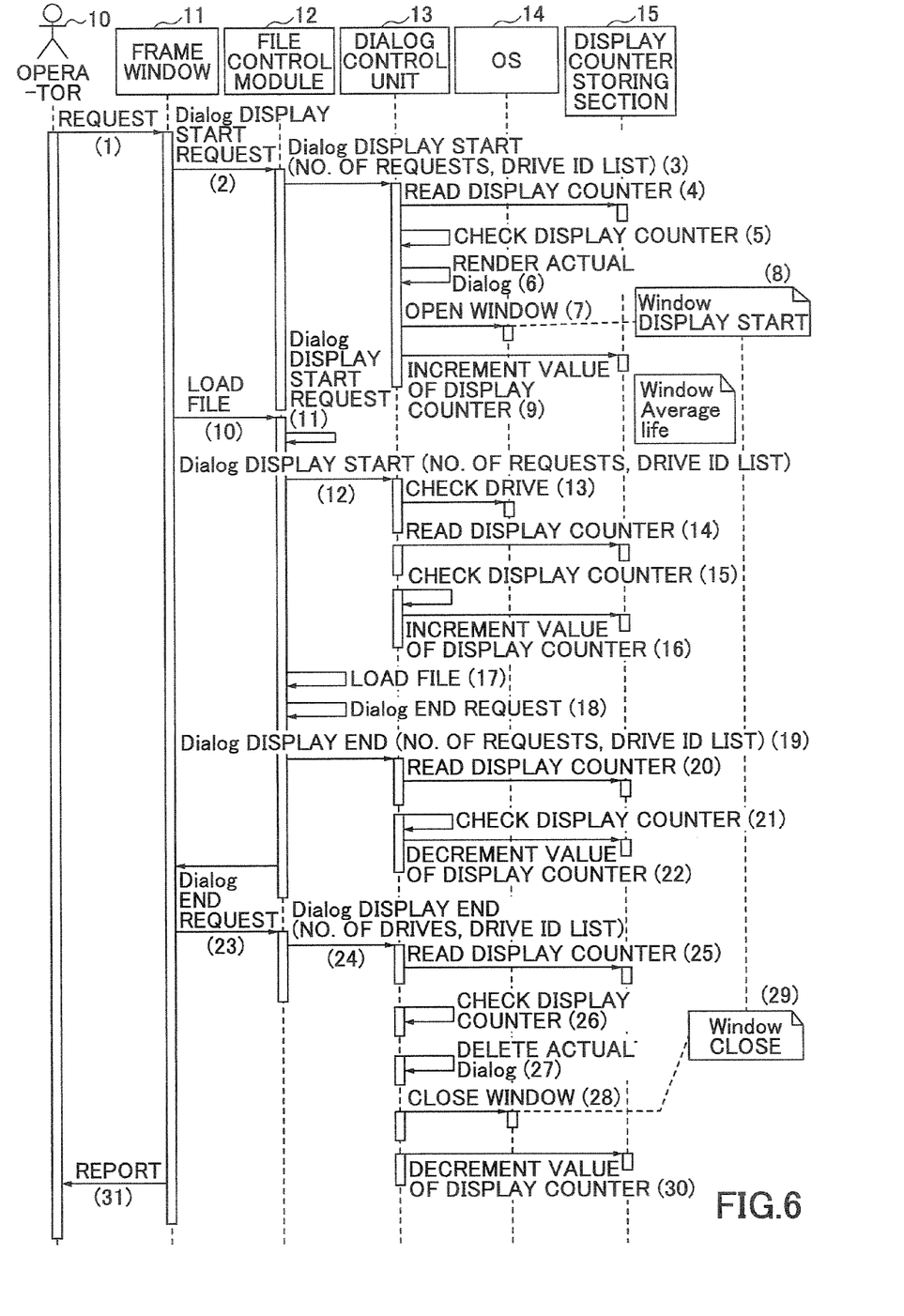
FIG. 6 is a sequence chart of a process according to a second embodiment of the present invention.

FIG. 6 is a sequence chart according to the second embodiment.

Similar to the first embodiment shown in FIG. 3, this example is for controlling a message indicating that a process is in progress when the operator 10 makes an instruction to load a file. The difference between FIG. 4 and FIG. 6 is that the second embodiment describes to a window display control operation when plural requests (in this example, two requests) are made.

(1) The operator 10 makes a request to load a file via UIs as shown in 1 and 2 of FIGS. 5A, 5B.

(2) The frame window 11 sends a first request to the file control module 12 to start displaying a Dialog window.

(3) The file control module 12 sends the first request to start displaying a Dialog window (call StartDialog) to the dialog control unit 13.

(4) First, the dialog control unit 13 checks the number of windows currently being displayed by referring to the display counter. Specifically, the dialog control unit 13 reads (READ) the display counter from the display counter storing section 15 via the display counter controller 16, and acquires the counter value. The dialog control unit 13 checks the display counter to determine whether the counter is indicating "0" (no windows displayed) or "1 or more".

(5) When the counter is indicating "0" (no windows displayed), the dialog control unit 13 calls a display function ShowDialog, which is an internal method.

(6) The dialog control unit 13 calls ShowDialog.

(7) The dialog control unit 13 sends a window display request to the OS 14.

(8) The OS 14 opens a window, and starts displaying a message. For example, a message shown in "3" of FIG. 5B is displayed.

(9) The dialog control unit 13 increments the value of the display counter by one (display counter UP), and writes the display counter value in the display counter storing section 15 via the display counter controller 16.

(10) Meanwhile, the file control module 12 loads the file.

(11) The frame window 11 sends a second request to start displaying a Dialog window to the file control module 12.

(12) The file control module 12 sends the second request to the dialog control unit 13 to start displaying a Dialog window (call StartDialog).

(13) The drive is checked.

(14) The dialog control unit 13 reads (READ) the display counter from the display counter storing section 15 via the display counter controller 16, and acquires the counter value.

(15) The dialog control unit 13 checks the display counter to determine whether the counter is indicating "0" (no windows displayed) or "1 or more".

(16) The counter is indicating "1 or more", and therefore, the dialog control unit 13 only increments the value of the display counter by one (display counter UP), without calling the display function ShowDialog (so that duplicate windows are not displayed), which is the internal method, and writes the display counter value in the display counter storing section 15 via the display counter controller 16.

(17) Meanwhile, the file control module 12 loads the file.

(18) The file control module 12 sends a first Dialog end request to the dialog control unit 13.

(19) The request is made (call EndDialog).

(20) The dialog control unit 13 reads (READ) the display counter from the display counter storing section 15 via the display counter controller 16, and acquires the counter value.

(21) The dialog control unit 13 checks the display counter to determine whether the counter is indicating "1" or "2 or more".

(22) The counter is indicating "2", and therefore, the dialog control unit 13 only decrements the value of the display counter by one (display counter DOWN), without sending a request to the OS 14 to close the window in response to the display end request, and writes the display counter value in the display counter storing section 15 via the display counter controller 16.

(23) The frame window 11 sends a second Dialog end request to the file control module 12.

(24) The file control module 12 makes an EndDialog call to the dialog control unit 13.

(25) The dialog control unit 13 reads (READ) the display counter from the display counter storing section 15 via the display counter controller 16, and acquires the counter value.

(26) The dialog control unit 13 checks the display counter to determine whether the counter is indicating "1" or "2 or more".

(27) The counter is indicating "1", and therefore, the dialog control unit 13 makes a CloseDialog call to the OS 14 and (28) sends a request to close the window.

(29) The OS 14 closes the window.

(30) The dialog control unit 13 decrements the value of the display counter by one (display counter DOWN), and writes the display counter value in the display counter storing section 15 via the display counter controller 16.

(31) The end of the sequence is reported to the operator 10.

The following is a summary of the above sequence.

When the first display start request is made, the frame window 11 that controls the UI sends a request to start displaying a window (call StartDialog) to the dialog control unit 13 via the file control module 12. The dialog control unit 13 checks the number of windows currently being displayed by referring to the display counter. When the counter is indicating "0" (no windows displayed), the dialog control unit 13 calls a display function ShowDialog, which is an internal method, sends a window display request to the OS 14, and increments the value of the display counter.

When the second display start request is made, the file control module 12 sends a request to start displaying a window (call StartDialog) to the dialog control unit 13. First, the dialog control unit 13 checks the number of windows currently being displayed by referring to the display counter. In this case, the counter is not indicating "0", and therefore, the dialog control unit 13 only increments the value of the display counter (UP), without calling the display function ShowDialog, which is the internal method, or sending a request to the OS 14 to display a window.

When a first display end request is made, the file control module 12 sends a window display end request (call EndDialog) to the dialog control unit 13. First, the dialog control unit 13 checks the display counter. The counter is not indicating "1", and therefore, the dialog control unit 13 only decrements the value of the display counter (DOWN), without calling the display function ShowDialog, which is the internal method, or sending a request to the OS 14 to close the window.

When a second display end request is made, the frame window 11 sends a window display end request (call EndDialog) to the dialog control unit 13 via the file control module 12. First, the dialog control unit 13 checks the display counter. The counter is indicating "1", and therefore, the dialog control unit 13 calls the display function CloseDialog, which is the internal method, and sends a request to the OS 14 to close the window. Then, the dialog control unit 13 decrements the value of the display counter (DOWN).

According to the second embodiment, an upper module can control the window displaying operation without determining whether it is necessary to make a call, and therefore, errors are prevented when a message window does not need to be displayed.

For example, when the operation of downloading a file from a removable medium is performed plural times, it is possible to prevent a situation where plural messages saying "Do not eject medium. The data may be destroyed." are displayed at the same time.

Figure 7:
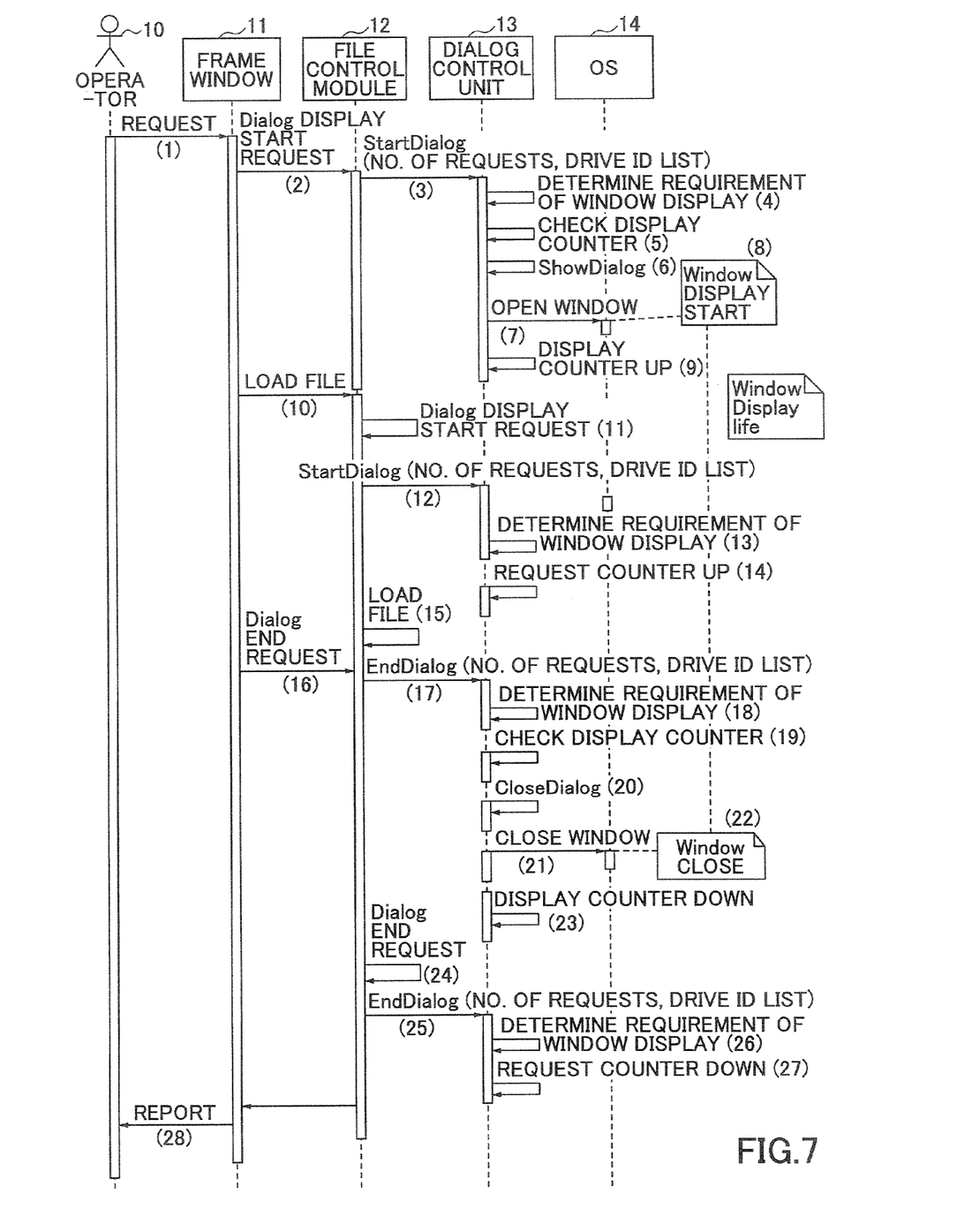
FIG. 7 is a sequence chart of a process according to a third embodiment of the present invention.
Figure 8:
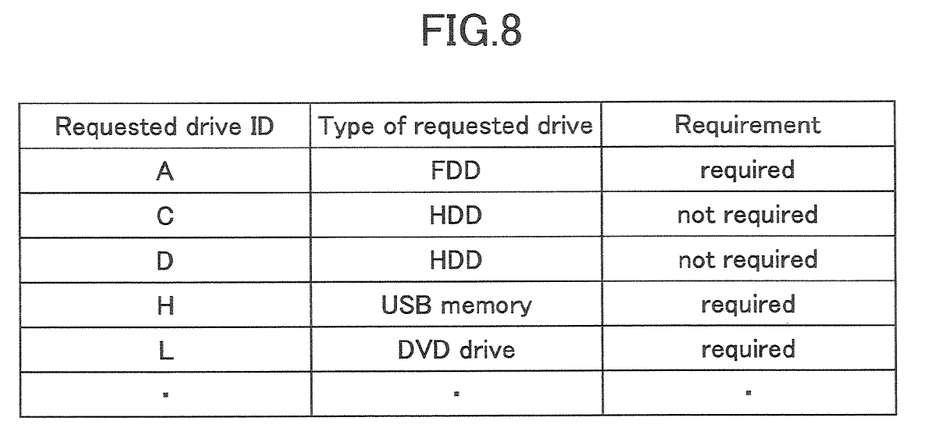
FIG. 8 is a display requirement table according to the third embodiment of the present invention.

FIG. 7 is a sequence chart according to the third embodiment. Similar to the second embodiment shown in FIG. 6, this example is of a window display control operation when plural requests are made. However, in this case, before checking the display counter when a display start request is made, it is determined whether it is necessary to display a window. When it is not necessary to display a window, the display start process is discontinued. Similarly, before checking the display counter when a display end request is made, it is determined whether it had been necessary to display a window. When it had not been necessary to display a window, the display end process is not performed. It is determined as to whether a window needs to be displayed by referring to a table (display requirement table) as shown in FIG. 8. By passing on a drive ID according to an argument of a StartDialog, information for determining whether it is necessary to display a window can be acquired by inquiring the drive type from the OS 14 or by referring to the display requirement table.

(1) The operator 10 makes a request to load a file via a UI.

(2) The frame window 11 sends a first Dialog display request to the file control module 12.

(3) The file control module 12 sends the first request to start displaying a Dialog window (call StartDialog) to the dialog control unit 13.

(4) The dialog control unit 13 refers to the display requirement table to determine whether a window needs to be displayed.

(5) The dialog control unit 13 checks the number of windows currently being displayed by referring to the display counter.

(6) When the counter is indicating "0" (no windows displayed), the dialog control unit 13 calls a display function ShowDialog, which is an internal method.

(7) The dialog control unit 13 sends a window display request to the OS 14.

(8) The OS 14 opens a window, and starts displaying a message.

(9) The dialog control unit 13 increments the display counter (UP).

(10) Meanwhile, the file control module 12 loads the file.

(11) The frame window 11 sends a second request to start displaying a Dialog window to the file control module 12.

(12) The file control module 12 sends the second request to start displaying a Dialog window (call StartDialog) to the dialog control unit 13.

(13) The dialog control unit 13 refers to the display requirement table to determine whether a window needs to be displayed.

(14) The dialog control unit 13 increments the value of the request counter (UP).

(15) Meanwhile, the file control module 12 loads the file.

(16) The frame window 11 sends a first Dialog end request to the file control module 12.

(17) The file control module 12 makes an EndDialog call to the dialog control unit 13.

(18) The dialog control unit 13 refers to the display requirement table to determine whether a window needs to be displayed (19) The dialog control unit 13 checks the display counter.

(20) The dialog control unit 13 calls a CloseDialog.

(21) The dialog control unit 13 sends a request to the OS 14 to close the window.

(22) The OS 14 closes the window.

(23) The dialog control unit 13 decrements the value of the display counter (DOWN).

(24) The file control module 12 sends a second Dialog end request to the dialog control unit 13.

(25) The file control module 12 makes an EndDialog call to the dialog control unit 13.

(26) The dialog control unit 13 refers to the display requirement table to determine whether a window needs to be displayed.

(27) The dialog control unit 13 decrements the value of the request counter (DOWN).

(28) The end of the sequence is reported to the operator 10.

According to the third embodiment, the incidence of errors is reduced, thus reducing the trouble inflicted on the operator.

Figure 9:
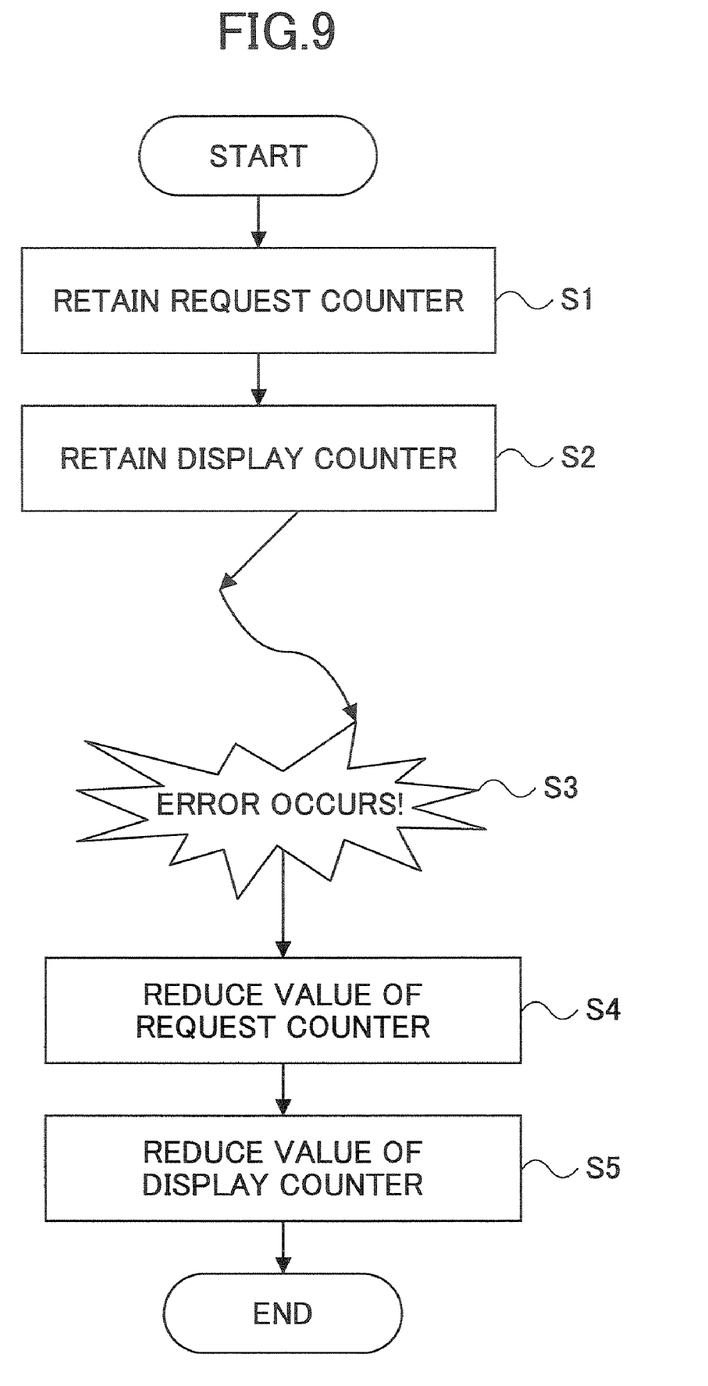
FIG. 9 is a flowchart of a roll back process performed when an error occurs according to the fourth embodiment of the present embodiment.

FIG. 9 is a flowchart according to the fourth embodiment of the present embodiment. According to the fourth embodiment, even when an error occurs when a display start request is made, it is possible to roll back to the status before the request had been made without any inconsistencies.

As shown in FIG. 9, the request counter and the display counter are retained (steps S1 and S2). When an error occurs (step S3), the value of the request counter is reduced (step S4), and the value of the display counter is reduced (step S5).

According to the fourth embodiment, it is possible to prevent malfunctions in programs.

Arguments of StartDialog, EndDialog of the dialog control class (dialog control unit 13) shown in FIG. 2 represent elements to forcibly start or forcibly end displaying a message window. Therefore, the process can be performed without depending on counter values. That is, it is possible make a request to forcibly start/forcibly end displaying a message window.

Thus, according to the fourth embodiment, communication can be performed even if a message monitoring section and a distribution destination are in remote environments.

A program executed by the CPU of the control unit 1 to perform the processes of the above embodiments corresponds to a program product according to an embodiment of the present invention. The program can be stored in a computer-readable recording medium according to an embodiment of the present invention. The recording medium can be a semiconductor storage device, an optical or a magnetic storage device, etc. The program product and the recording medium can be used in devices or systems other than those described in the above embodiments and can be executed by a CPU therein to attain substantially the same effects as the above described embodiments of the present invention.

According to one embodiment of the present invention, only a single window is displayed at once, thus improving operability.

Further, according to one embodiment of the present invention, the incidence of errors is reduced, thus reducing the trouble inflicted on the operator. Moreover, efficiency is enhanced for designers in designing upper modules.

Further, according to one embodiment of the present invention, a deadlock status does not occur when a failure occurs, and therefore, the OS need not be rebooted.

The present invention is not limited to the specifically disclosed embodiments, and variations and modifications may be made without departing from the scope of the present invention.

The present application is based on Japanese Priority Patent Application No. 2006-071725, filed on Mar. 15, 2006, and Japanese Priority Patent Application No. 2006-356386, filed on Dec. 28, 2006, the entire contents of which are hereby incorporated by reference.

What is claimed is:

1. A message window display control apparatus, comprising:
   a display configured to display, in a message window, a message indicating that a corresponding process of a computer is in progress;
   a message counter configured to count a number of messages;
   a request unit configured to make a request to start or end displaying a message;
   a request counter configured to count a number of the requests to start displaying the messages;
   a display control unit configured to control the display based on the number of messages indicated by the message counter and the number of requests indicated by the request counter, wherein the display control unit automatically controls the display not to display plural message windows at a same time in response to the request unit making plural message display requests, so that only a single message window having a single message indicating that the corresponding process of the computer is in progress is displayed at a time, even when plural message display requests are made, and the display control unit controls the display not to close the message window in response to the request unit making the request to end displaying the message, when the number of messages indicated by the message counter is two or more; and
   a display requirement table indicating whether the message window needs to be displayed,
   wherein the display control unit refers to the display requirement table so that an error does not occur in response to the request unit making the request for which the message window does not need to be displayed.

2. The message window display control apparatus according to claim 1, wherein
   the request unit makes the request to forcibly start or forcibly end displaying the message window.

3. The message window display control apparatus according to claim 1, wherein the display control unit is configured
   to increment the number of messages indicated by the message counter in response to the request unit making a message display request, and
   not to control the display to display a message window corresponding to the message display request when the number of messages indicated by the message counter is one or more.

4. A message window display control method, comprising:
   displaying, in a message window on a display, a message indicating that a corresponding process of a computer is in progress;
   counting a number of messages;
   making a request to start or end displaying a message;

counting a number of the requests to start displaying the messages; and controlling the display based on the number of counted messages and the number of counted requests, wherein the displaying step includes controlling the display not to display plural message windows at a same time in response plural message display requests, so that only a single message window having a single message indicating that the corresponding process of the computer is in progress is displayed at a time, even when plural message display requests are made, and the displaying step includes controlling the display not to close the message window in response to a request to end displaying the message, when the number of counted messages is two or more, wherein the displaying step includes referring to a display requirement table, which indicates whether the message window needs to be displayed, so that an error does not occur in response to a request for which the message window does not need to be displayed displaying a message in a message window;

requesting another message be displayed;

refraining from displaying plural message windows at the same time in response to the requesting of said another message be displayed such that only one message window having only the another message indicating that a corresponding process of a computer is in progress is displayed, even when plural message display requests are made; and terminating the display of said another message without closing the message window, in response to a request to terminate the display of said another message, and displaying said message.

5. The message window display control method according to claim 4, further comprising the step of:

making a request to forcibly start or forcibly end displaying the message window.

6. A non-transitory computer-readable medium storing a computer program that causes a computer to execute the steps of claim 4.

7. The computer-readable medium according to claim 6, wherein the program further causes the computer to execute the steps of:

counting a number of the message windows being displayed;

counting a number of the requests being made to start displaying the message window; and reducing the number of the counted message windows and the number of the counted requests in response to the error.

8. The computer-readable medium according to claim 6, wherein the program further causes the computer to execute the step of:

making the request to forcibly start or forcibly end displaying the message window.

* * * * *